United States Patent [19]
Kikuchi et al.

[11] Patent Number: 6,118,237
[45] Date of Patent: Sep. 12, 2000

[54] VEHICULAR HYBRID DRIVE SYSTEM WITH BATTERY ARCTIC MANAGEMENT

[75] Inventors: Toshio Kikuchi, Kanagawa; Shinichiro Kitada, Tokyo; Yu Owada, Kanagawa; Yutaro Kaneko, Yokohama, all of Japan

[73] Assignee: Nissan Motor Co., Ltd., Yokohama, Japan

[21] Appl. No.: 09/346,532

[22] Filed: Jul. 2, 1999

[30] Foreign Application Priority Data

Jul. 3, 1998 [JP] Japan ................................ 10-189397

[51] Int. Cl.[7] ........................................................ H02J 7/00
[52] U.S. Cl. ............................................. 318/139; 318/153
[58] Field of Search ................................. 320/43, 35, 122, 320/149, 21; 318/139, 153

[56] References Cited

U.S. PATENT DOCUMENTS

| | | | |
|---|---|---|---|
| 4,407,132 | 10/1983 | Kawakatsu et al. | 60/716 |
| 4,709,202 | 11/1987 | Koenck et al. | 320/43 |
| 5,363,031 | 11/1994 | Miller et al. | 320/21 |
| 5,823,280 | 10/1998 | Lateur et al. | 180/65.2 |
| 5,873,426 | 2/1999 | Tabata et al. | 180/65.7 |
| 5,939,861 | 8/1999 | Joko et al. | 320/122 |
| 6,007,443 | 12/1999 | Onimaru et al. | 475/5 |

*Primary Examiner*—Paul Ip
*Assistant Examiner*—Ritor Leykin
*Attorney, Agent, or Firm*—Foley & Lardner

[57] ABSTRACT

A battery management for a hybrid drive system for a vehicle recovers input and output performance of a battery if the battery temperature is low. If the battery temperature is less than or equal to a predetermined value (or if the battery internal resistance is greater than or equal to a predetermined value), the battery needs to recover its input and output performance. Under this condition, the state of charge (SOC) of the battery is determined and compared with a predetermined value. The comparison result is used to determine whether the battery is capable of discharging or the battery needs charging. If SOC is greater than or equal to the predetermined value, a controller conducts forced discharge from the battery to operate an electric motor of the hybrid drive system in power mode. This forced discharge causes an increase ion the battery temperature, thus causing the battery to recover its input and output performance.

8 Claims, 4 Drawing Sheets

VEHICULAR HYBRID DRIVE SYSTEM WITH BATTERY ARCTIC MANAGEMENT

FIELD OF THE INVENTION

The present invention relates to a hybrid drive system for a vehicle, and more particularly to a battery management in arctic environments.

BACKGROUND OF THE INVENTION

A hybrid drive system for a vehicle comprises a fuel powered heat engine and a battery powered electric motor, at least one of which is used to drive the vehicle. In the hybrid drive system, a battery provides electric power to the motor. The output of the battery must be maintained at a sufficiently high level under varying environment conditions to meet power request demand on the motor. If the battery temperature drops, the internal resistance within the battery increases. This causes a drop in the level of the output of the battery. Accordingly, there exists a need to maintain the output of the battery at a sufficiently high level under varying temperature conditions.

SUMMARY OF THE INVENTION

An object of the present invention is to provide a battery management, which recovers the level of input and output to and from a battery of a hybrid drive system if the battery temperature tends to drop.

According to one aspect of the present invention, there is provided a hybrid drive system for a vehicle, comprising:

a battery;

a battery powered electric motor by said battery;

sensors to sense parameters indicative of the state of said battery; and a controller to input information of state of charge (SOC) of said battery from said sensed parameters indicative of the state of said battery, said controller being operative to establish, in response to a demand for recovery of said battery, supply of electric energy from said battery to said electric motor when the state of charge (SOC) of said battery is greater than or equal to a predetermined value.

According to a specific aspect of the present invention, there is provided a hybrid drive system for a vehicle, comprising:

a battery;

a battery powered electric motor by said battery;

sensors to sense parameters indicative of the state of said battery; and a controller to input information of battery temperature of said battery and information of state of charge (SOC) of said battery from said sensed parameters indicative of the state of said battery, said controller being operative to conduct a forced discharge from said battery by establishing supply of electric energy from said battery to said electric motor when the battery temperature is less than or equal to a predetermined temperature value and the state of charge (SOC) of said battery is greater than or equal to a predetermined SOC value, said controller being operative to conduct a forced charge to said battery by establishing supply of electric energy to said battery from said electric motor when the battery temperature is less than or equal to said predetermined temperature value and the state of charge (SOC) of said battery is less than said predetermined SOC value.

According to a further aspect of the present invention, there is provided a hybrid drive system for a vehicle, comprising:

a fuel powered engine;

a battery;

a battery powered electric motor by said battery, said electric motor being in driving relationship with said engine;

sensors to sense parameters indicative of the state of said battery;

sensors to sense parameters indicative of the state of said engine;

a controller to input information of state of charge (SOC) of said battery from said sensed parameters indicative of the state of said battery, said controller being operative to determine based on said sensed parameters indicative of said engine whether or not said engine is being powered by fuel, said controller being operative to conduct a forced discharge from said battery, in response to a demand for recovery of said battery, by establishing supply of electric energy from said battery to said electric motor when the state of charge (SOC) of said battery is greater than or equal to a predetermined value, thereby to cause said electric motor to start up said engine unless said engine is being powered by fuel and to operate in power mode after starting up said engine.

According to another aspect of the present invention, there is provided a method for the management of a battery to power an electric motor of a hybrid drive system for a vehicle, comprising:

sensing parameters indicative of the state of the battery;

deriving information of the state of charge (SOC) of the battery from said sensed parameters indicative of the state of the battery; and establishing, in response to a demand for recovery of the battery, supply of electric energy from the battery to the electric motor when the state of charge (SOC) of the battery is greater than or equal to a predetermined value.

DESCRIPTION OF THE PREFERRED EMBODIMENTS

Figure 1:
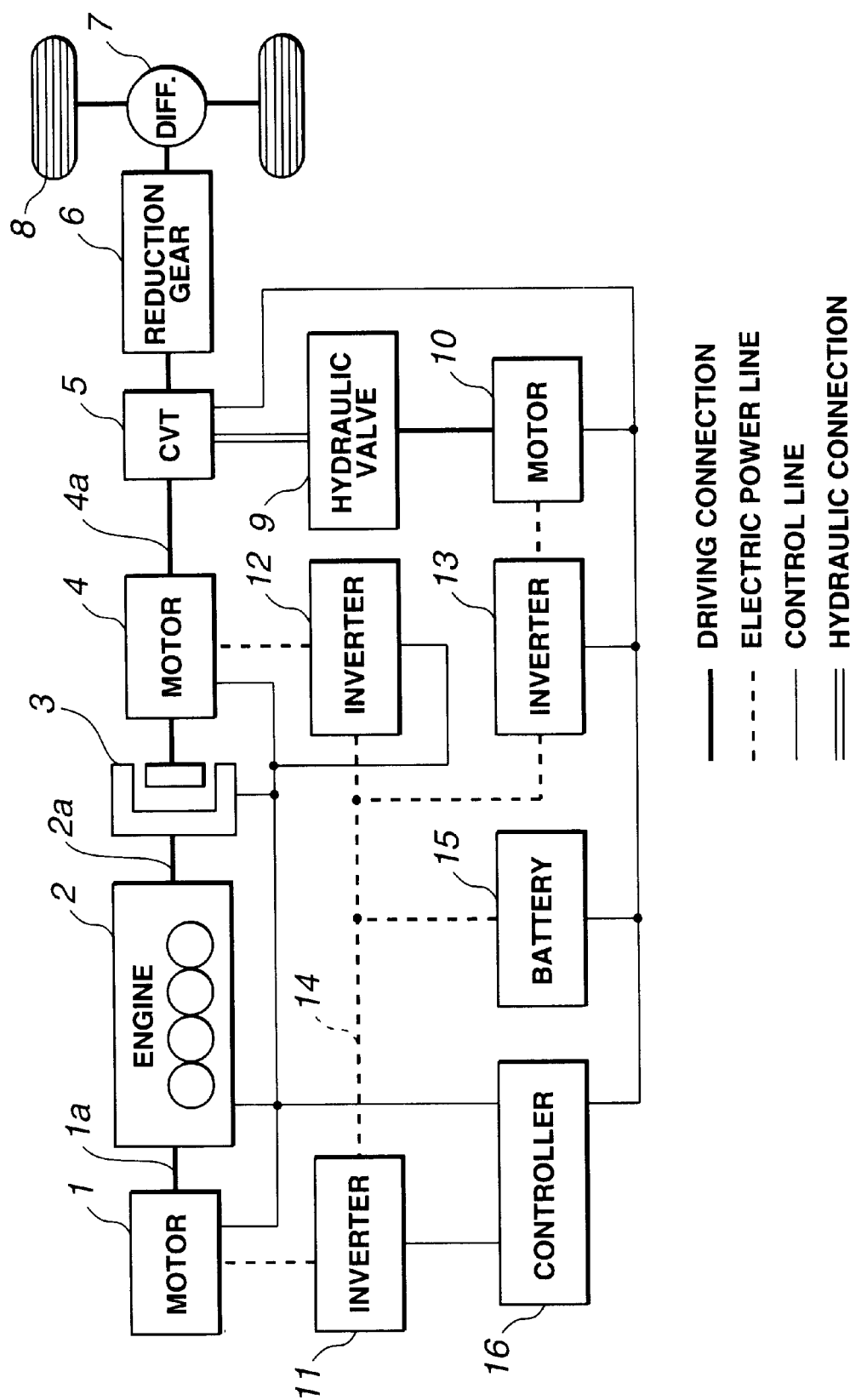
FIG. 1 is a generalized block diagram of a hybrid drive system for a vehicle.

A hybrid drive system incorporating the preferred implementation of the present invention is shown in FIG. 1. For simplicity in showing, the various elements are not shown in their physical relationships. The implementation of this invention can be used to power an automobile, truck, etc.

First, second and third electric motors 4, 1 and 10 are electrically connected to inverters 12, 11 and 13, respectively, which are connected to a controller 16. In the preferred embodiment, the first, second and third electric motors 4, 1 and 10 are three phase AC motors, however, it should be appreciated that other types of electric motors may be used, for example multi-pole DC permanent magnet motors. In the latter case, DC/DC converters are used instead of inverters. The inverters 12, 11 and 13 are electrically connected by DC link 14 to a main battery pack 15 for charging the battery pack during generator mode and powering the motors 4, 1 and 10 during motor mode. The inverters 12, 11 and 13 are electrically interconnected by DC link 14 for allowing direct supply of current generated by one motor in generator mode to power another motor in motor mode bypassing the battery pack 15. In the preferred embodiment, the battery 15 is a lithium ion battery, however, it will be noted that other types of battery may be used, for example nickel hydrogen battery or copper battery.

The first motor 4 has a rotor 4a in driving relationship with at least one driven wheel 8 of a vehicle. In particular, the first motor 4 is coupled via a continuously variable transmission (CVT) 5 to the vehicle drive transmission that includes a reduction gear 6 and a differential 7. The CVT 5 can change ratio continuously. In the preferred embodiment, the CVT 5 includes an input pulley, an output pulley, an input shaft, an output shaft, a V-belt, and a hydraulic control unit 9. The input pulley is mounted to the input shaft and the output pulley is mounted to the output shaft. The V-belt interconnects the input and output pulleys. The rotor 4a of the first motor 4 is drivingly connected to the input shaft of the CVT 5. The output shaft of the CVT 5 is drivingly connected to the reduction gear 6. It should be appreciated that other type of CVT may be used, for example hydrostatic and friction CVTs. The third motor 10 is used to drive an oil pump within the hydraulic control unit 9.

A fuel powered heat engine 2 has a drive shaft 2a. The second motor 1 has a second rotor 1a in driving connection to the engine drive shaft 2a. In the preferred embodiment, a chain or belt provides the driving connection between the second rotor 1a of the second motor 1 and the engine drive shaft 2a. The engine drive shaft 2a is connected to a clutch 3 to engage and disengage the engine 2 to and from the driven wheel 8. The clutch 3 is positioned between the engine drive shaft 2a and the first rotor 4a of the first motor 4. The clutch 3 is an electromagnetic powder clutch. Torque transmitted by the electromagnetic powder clutch 3 is proportional to flow of current to energize the clutch 3.

The controller 16 includes a microcomputer with peripheral equipment and various kinds of actuators. The controller 16 can perform speed control and torque control of the engine 2, control of torque transmission by the clutch 3, speed control and torque control of the first, second and third motors 4, 1 and 10, and ratio control of the CVT 5.

Figure 2:
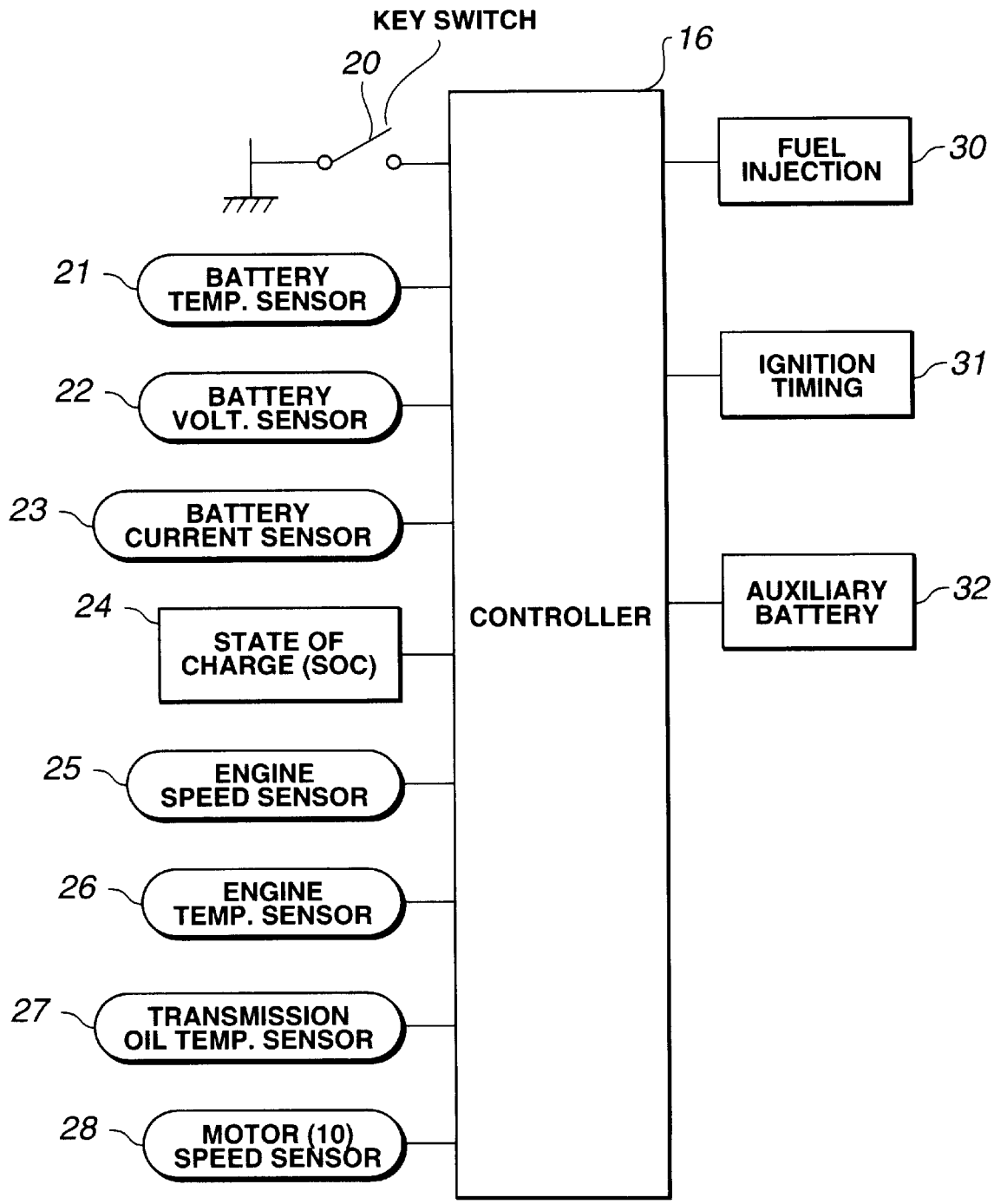
FIG. 2 illustrates major components positioned in the vehicle.

Referring to FIG. 2, the controller 16 is connected to a key switch 20. The key switch 20 is closed or turned on when the vehicle key is place to "ON" position or "START" position.

To monitor the main battery pack 15, the controller 16 inputs information of the battery temperature Tb, battery voltage Vb and battery current Ib. In this example, a battery voltage temperature sensor 21 senses temperature Tb [° C.] of the battery 15 and feeds its sensor output to the controller 16. A battery voltage sensor 22 senses voltage Vb [V] at terminals of the battery 15 and feeds its sensor output to the controller 16. A battery current sensor 23 senses the flow of electric current Ib [A] during charge and discharge to and from the battery 15 and feeds its sensor output to the controller 16. The controller 16 may input information of internal resistance Rb within the battery 15 instead of the battery temperature Tb. As is well known, the internal resistance Rb is the resistance to the flow of electric current within the battery 15 and may be determined by interpolation based on measures of voltage Vb and the floe of electric current Ib. As an important parameter indicative of the state of the battery 15, the state of charge (SOC) [%] of the battery 15 is well known. An external sensor may sense the SOC. Alternatively, the SOC may be determined based on the battery voltage Vb and the battery temperature Tb as discussed in co-pending U.S. patent application Ser. No. 09/061,061, entitled "HYBRID ELECTRIC VEHICLE WITH BATTERY MANAGEMENT", filed Apr. 16, 1998 and commonly assigned herewith. This co-pending U.S. patent application Ser. No. 09/061,061 is hereby incorporated by reference in its entirety. In FIG. 2, a box 24 indicates detection of SOC for illustration purpose only.

To monitor the engine 2, the controller 16 inputs information of the engine speed Ne [rpm] and the engine coolant temperature Te. The controller 16 uses the engine speed Ne and the coolant temperature Te to determine whether or not the engine 2 is being powered by fuel. In other words, these parameters are used to determine whether or not cranking operation of the engine 2 by the motor 1 would interfere with current operation the hybrid drive system. An engine speed sensor 25 senses a parameter indicative of speed of rotation of the engine drive shaft 2a and sends its output signal to the controller 16. An engine coolant temperature sensor 26 senses temperature of the engine oil and sends its output to the controller 16.

To monitor an oil pump of the hydraulic control unit 9 for the CVT 5, the controller 16 input information of transmission oil temperature Tc and speed of rotation Nc of the motor 10. These parameters are used to determine whether or not high-speed rotation of oil pump by the motor 10 would interfere with current operation of the hydraulic control unit 9.

Also illustrated in FIG. 2 are actuators to adjust fuel injection 30, ignition timing 31 and valve timing 32 of the engine 2. To power the controller 16, an auxiliary battery 33 is provided.

Figure 3:
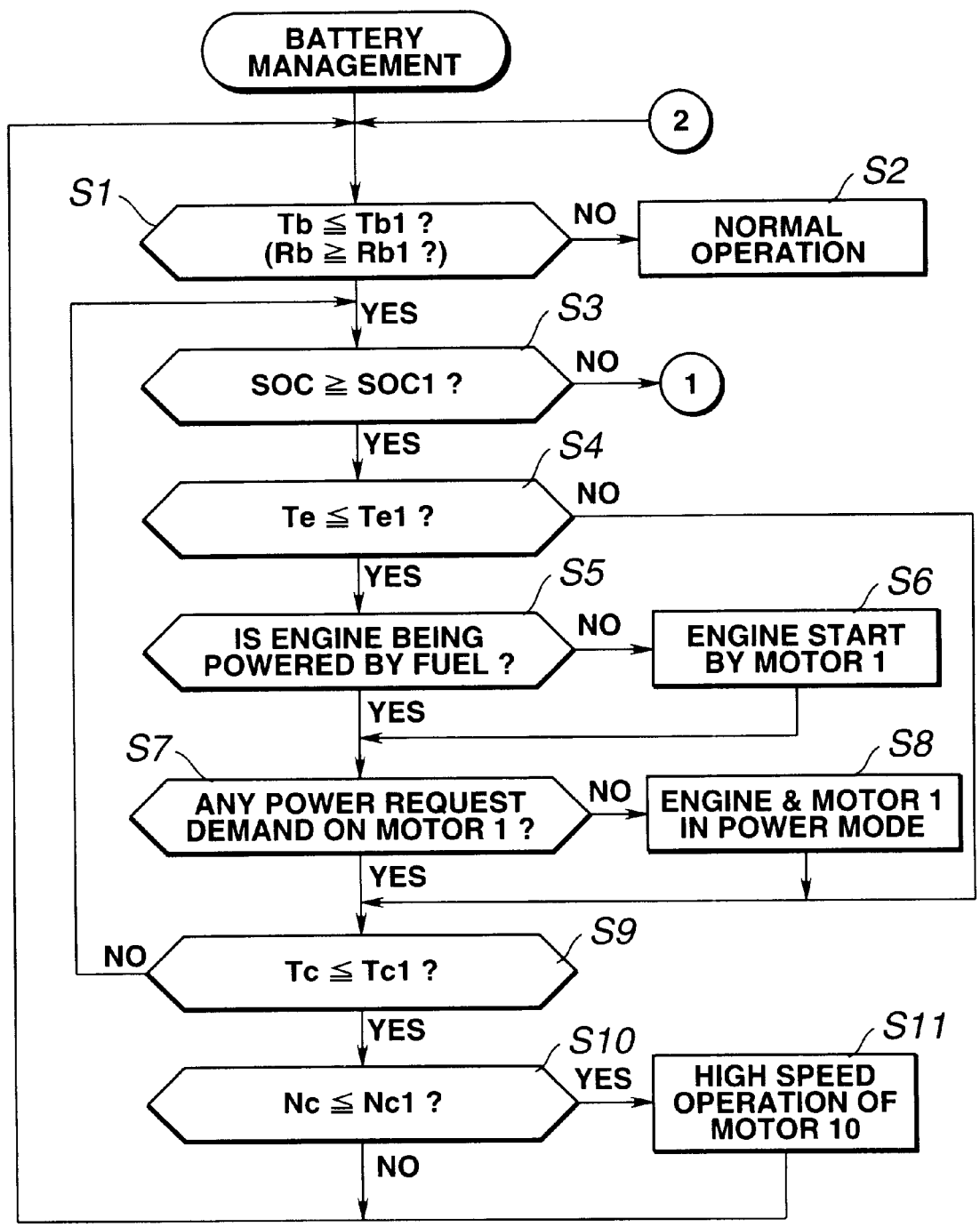
FIG. 3 is a flow chart illustrating a portion of a control routine.
Figure 4:
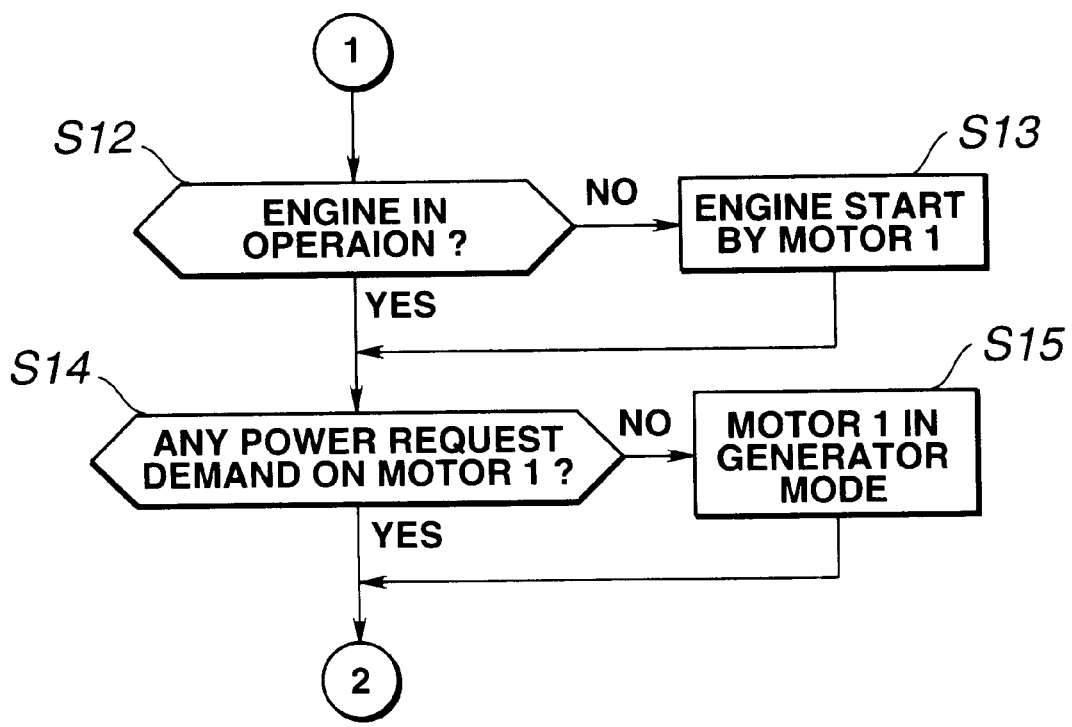
FIG. 4 is a flow chart illustrating the remaining portion of the control routine.

The flow chart of FIGS. 3 and 4 illustrates the preferred implementation according to the present invention.

The controller 16 repeats execution of this control routine while the key switch 20 is being turned on. In step S1, the controller 16 determines whether or not the temperature Tb indicates that the main battery 15 is in the optimum state for use in powering the motors 1, 4 and 10 to keep the vehicle in operation.

Describing on the relationship between the state of the battery 15 and its temperature Tb, the battery temperature Tb has a great influence on charge and discharge performance of the battery 15. If the temperature Tb is lower than the lower limit of a predetermined optimum range, the charge and discharge performance drops, making it difficult for the battery 15 to meet the performance request as a source of energy of the vehicle. If the temperature Tb is higher than the upper limit of the predetermined optimum range, the performance deteriorates at a quick rate, shortening its operating life.

The battery temperature Tb may be estimated from internal resistance Rb of the battery 15. There exists a predetermined relationship between them. The internal resistance Rb becomes large as the temperature Tb drops. The internal resistance Rb becomes small as the temperature Tb rises.

The internal resistance Rb at a battery temperature is defined as a gradient of a V-I characteristic of the battery 15 at the temperature. Such V-I characteristic may be given by plotting measures of battery voltage Vb against measures of battery current Ib.

In the preferred implementation of the present invention, it is intended to keep the battery 15 ready for charge and discharge at sufficiently high rate. Thus, if, in step S1, the temperature Tb is less than or equal to a predetermined value Tb1 (Tb≦Tb1) or the internal resistance Rb is greater than or equal to a predetermined value Rb1 (Rb≧Rb1), the battery 15 will be forced to operate in charge or discharge mode. Operating the battery 15 in charge or discharge mode will increase the temperature Tb.

If the interrogation in step S results in affirmative, the controller 16 determines that the battery 15 is not in the optimum state for use in powering the motors 1, 4 and 10 to keep the vehicle in operation. In this case, the routine goes from step S1 to step S3. If the interrogation in step S1 results in negative, the controller 16 determines that battery 15 is in the optimum state for use in powering the motors 1, 4 and 10 to keep the vehicle in operation. Then, the routine goes to step 52 for allowing normal charge and discharge operation of the battery 15.

In step S3, the controller 16 inputs state of charge (SOC) of the battery 15 and determines whether or not the SOC is greater than or equal to a predetermined value SOC1. If this is the case, the routine goes to step S4. If this is not the case, SOC<SOC1, the routine goes to step S12 as shown in FIG. 12. In step S4, the controller 16 determines whether or not engine coolant temperature Te is less than or equal to a predetermined value Te1 If this is the case, the routine goes to step S5. If this is not the case, Te>Te1, the routine goes to step S9.

In the case where SOC is greater than or equal to SOC1 and Te is less than or equal to Te1, the controller 16 conducts forced discharge from the battery 15 to cause an increase in battery temperature Tb. In step S5, the controller 16 determines whether or not the engine 2 is being powered by fuel. If this is not the case, the routine goes to step S6. In step S6, the controller 16 conducts supply of current from the battery 15 to the motor 1, causing the motor 1 to start the engine 2. The routine goes to step S7 after the engine 2 has been started. In step S7, the controller 16 determines whether or not there is any power request demand on the motor 1 for the purpose of driving the vehicle. If there is no such power request command, the routine goes to step S8. In step S8, the controller 16 conducts supply of current from the battery 15 to the motor 1. The motor 1 operates in power mode to assist the engine 2 in turning the drive shaft 2a.

Such forced discharge from the battery 15 causes an increase in temperature Tb. Subsequently, if the temperature Tb exceeds Tb1 or the internal resistance Rb drops below Rb1, the controller 16 determines that the battery 15 has recovered and terminates the forced discharge from the battery 15.

In the preferred implementation, the routine goes from step S7 or S8 to step S9. In step S9, the controller 16 determines whether or not the transmission oil temperature Tc is less than or equal to a predetermined value Tc1. If this is the case, the routine goes to step S10. In step S10, the controller 16 determines whether or not motor speed Nc of the motor 10 for driving the oil pump is less than or equal to a predetermined value Nc1. If this is the case, the routine goes to step S11. In step S11, the controller 16 conducts supply of current to the motor 10, causing the motor 10 to rotate at high speed. In this manner, the controller 16 conducts forced discharge from the battery 15 to both of the motors 1 and 10 to quickly increase the battery temperature Tb, thus shortening time required to recover the battery 15.

If SOC of the battery 15 is less than SOC1, the controller 16 conducts forced charge to the battery 15. In step S12 of FIG. 4, the controller 16 determines whether or not the engine 2 is in operation or not. If this is not the case, the routine proceeds to S13. In step S13, the controller 16 conducts supply of current from the battery 15 to the motor 1, causing the motor 1 to start the engine 2. After step 513 or step S12, the routine goes to step S14. In step S14, the controller 16 determines whether or not there is any power request demand on the motor 1 for the purpose of driving the vehicle. If this is not the case, the routine goes to step S15. In step S15, the controller 16 operates the motor 1 in generator mode, charging the battery 15. After step S15, the routine goes to step S1 in FIG. 3. If, in step S14, there is power request demand on the motor 1 for the purpose of driving the vehicle, the routine goes from step S14 to step S1.

The forced charge to the battery 15 causes an increase in the battery temperature Tb. Subsequently, if the temperature Tb exceeds Tb1 or the internal resistance Rb drops below Rb1, the controller 16 determines that the battery 15 has recovered and terminates the forced charge to the battery 15.

In the preferred implementation, the present invention is described as being operational with the vehicle hybrid drive system as shown in FIGS. 1 and 2. The hybrid drive system is not limited to this example. The present invention is operational with any type of vehicle hybrid drive systems as long as an engine and/or an electric motor are in driving relationship with driven wheel of a vehicle. In the example illustrated in FIG. 1, two electric motors 1 and 4 share engine start-up, generation and vehicle driving operations. The present invention is operational with a vehicle hybrid drive system where a single electric motor performs all of the operations.

The content of disclosure of Japanese Patent Application No. 10-189397 (filed Jul. 3, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A hybrid drive system for a vehicle, comprising;

a battery;

an electric motor powered by said battery;

sensors to sense parameters indicative of a state of said battery; and a controller to input information of battery temperature of said battery and information of a state of charge (SOC) of said battery from said sensed parameters indicative of the state of said battery, said controller being operative to conduct a forced discharge from said battery by establishing supply of electric energy from said battery to said electric motor when the battery temperature is less than or equal to a predetermined temperature value and the state of charge (SOC) of said battery is greater than or equal to a predetermined SOC value, said controller being operative to conduct a forced charge to said battery from said electric motor by establishing supply of electric energy to said battery from said electric motor when the battery temperature is less than or equal to said predetermined temperature value and the state of charge (SOC) of said battery is less than said predetermined SOC value.

2. A hybrid drive system for a vehicle, comprising:

a fuel powered engine;

a battery;

an electric motor powered by said battery, said electric motor being in driving relationship with said engine;

sensors to sense parameters indicative of a state of said battery;

sensors to sense parameters indicative of a state of said engine;

a controller to input information of a state of charge (SOC) of said battery from said sensed parameters indicative of the state of said battery, said controller being operative to determine based on said sensed parameters indicative of the state of said engine whether or not said engine is being powered by fuel, said controller being operative to conduct a forced discharge from said battery, by establishing supply of electric energy from said battery to said electric motor when the state of charge (SOC) of said battery is greater than or equal to a predetermined value, thereby to cause said electric motor to start up said engine unless said engine is being powered by fuel and to operate in power mode after starting up said engine.

3. The hybrid drive system as claimed in claim 2, further comprising:

a continuously variable transmission (CVT) having an oil pump in driving association with said engine;

an electric motor for driving said oil pump; and a sensor to sense oil temperature of oil within said oil pump;

wherein said controller is operative to conduct said forced discharge from said battery by establishing supply of electric energy from said battery to said electric motor for driving said oil pump when the sensed oil temperature is less than or equal to a predetermined temperature value.

4. The hybrid drive system as claimed in claim 2, wherein said controller is operative to conduct said forced charge operation when the state of charge (SOC) of said battery is less than said predetermined SOC value by establishing supply of electric energy from said battery to said electric motor to start up said engine and then establishing supply of electric energy to said battery from said motor by operating said electric motor in generator mode.

5. The hybrid drive system as claimed in claim 2, wherein said sensors to sense parameters indicative of the state of said battery includes a battery temperature sensor to sense battery temperature of said battery, a battery voltage sensor to sense voltage at terminals of said battery and a battery current sensor to sense flow of electric current during discharge and charge from and to said battery.

6. The hybrid drive system as claimed in claim 2, wherein said sensors to sense parameters indicative of the state of said engine includes an engine speed sensor to sense a parameter indicative of speed of rotation of said engine and an engine coolant temperature sensor to sense temperature of the engine coolant.

7. A method for the management of an electric motor for powering an electric motor of a vehicular hybrid drive system including a fuel powered engine, comprising:

sensing parameters indicative of a state of a battery;

sensing parameters indicative of a state of the engine;

deriving information of a state of charge (SOC) of the battery from said sensed parameters indicative of the state of the battery;

determining based on said sensed parameters indicative of the state of the engine whether or not the engine is being powered by fuel; and conducting a forced discharge from the battery, by establishing supply of electric energy from the battery to the electric motor when the state of charge (SOC) of the battery is greater than or equal to a predetermined value, thereby to cause the electric motor to start up the engine unless the engine is being powered by fuel and to operate in power mode after starting up the engine.

8. A method for the management of a battery to power an electric motor of a hybrid drive system for a vehicle, comprising:

sensing parameters indicative of the state of the battery;

deriving information of the state of charge (SOC) of the battery from said sensed parameters indicative of the state of the battery; and deriving information of battery temperature of the battery and information of the state of charge (SOC) of the battery from said sensed parameters indicative of the state of the battery, conducting a forced discharge from the battery by establishing supply of electric energy from the battery to the electric motor when the battery temperature is less than or equal to a predetermined temperature value and the state of charge (SOC) of the battery is greater than or equal to a predetermined SOC value, conducting a forced charge to the battery by establishing supply of electric energy to the battery from the electric motor when the battery temperature is less than or equal to said predetermined temperature value and the state of charge (SOC) of said battery is less than said predetermined SOC value.

* * * * *